US008845967B2

(12) United States Patent
Grimm et al.

(10) Patent No.: US 8,845,967 B2
(45) Date of Patent: Sep. 30, 2014

(54) CONTAINER AND A DEVICE FOR INDIRECTLY COOLING MATERIALS AND METHOD FOR PRODUCING THE CONTAINER

(75) Inventors: Bert-Olaf Grimm, Leipzig (DE); Peter Zehnel, Leipzig (DE); Kai Marschner, Halle (DE)

(73) Assignee: Eppendorf AG, Hamburg (DE)

( * ) Notice: Subject to any disclaimer, the term of this patent is extended or adjusted under 35 U.S.C. 154(b) by 0 days.

(21) Appl. No.: 13/539,137

(22) Filed: Jun. 29, 2012

(65) Prior Publication Data

US 2012/0264582 A1 Oct. 18, 2012

Related U.S. Application Data

(63) Continuation of application No. 12/644,568, filed on Dec. 22, 2009, now abandoned.

(60) Provisional application No. 61/139,880, filed on Dec. 22, 2008.

(51) Int. Cl.
*G01N 9/30* (2006.01)

(52) U.S. Cl.
USPC .............. 422/72; 422/547; 422/548; 422/566

(58) Field of Classification Search
USPC ........................................... 422/72, 547, 560
See application file for complete search history.

(56) References Cited

U.S. PATENT DOCUMENTS

| | | | |
|---|---|---|---|
| 4,690,669 A * | 9/1987 | Williams et al. | 494/14 |
| 5,477,704 A * | 12/1995 | Wright | 62/381 |
| 5,504,007 A | 4/1996 | Haynes | |
| 2004/0159798 A1 | 8/2004 | Martin et al. | |

FOREIGN PATENT DOCUMENTS

| | | |
|---|---|---|
| DE | 202004014916 U1 | 12/2004 |
| DE | 202007014916 | 4/2008 |
| EP | 1443290 | 8/2004 |
| EP | 2053179 | 4/2009 |
| FR | 2461215 | 1/1980 |
| JP | H0225045 U | 2/1990 |
| JP | 2000015142 | 1/2000 |
| WO | WO-98/35195 A1 | 8/1998 |

OTHER PUBLICATIONS

European Search Report dated Mar. 30, 2012 for corresponding EP Application No. 09015245.

* cited by examiner

*Primary Examiner* — Jill Warden
*Assistant Examiner* — Dwayne K Handy
(74) *Attorney, Agent, or Firm* — Patterson & Sheridan, LLP

(57) ABSTRACT

The present relates to a container and to a device for indirect material cooling and to a method for producing the container according to the invention. Through the present invention a much more efficient indirect heat transfer is facilitated from the exterior of the container into the interior of the container. The improvement of the heat conductivity and of the heat transfer of centrifuge containers yields a reduction of the necessary power of the refrigeration system for cooled centrifuges. Through the higher performance of the centrifuge a higher speed can be run for identical centrifuge temperatures and/or at the same centrifuge temperature and speed, the input power of the refrigeration unit can be reduced.

7 Claims, 4 Drawing Sheets

CONTAINER AND A DEVICE FOR INDIRECTLY COOLING MATERIALS AND METHOD FOR PRODUCING THE CONTAINER

CROSS-REFERENCE TO RELATED APPLICATIONS

This application is a continuation of a co-pending U.S. patent application Ser. No. 12/644,568, filed Dec. 22, 2009, which claims benefit of U.S. provisional patent application Ser. No. 61/139,880, filed Dec. 22, 2008. Each of the aforementioned patent applications is herein incorporated by reference.

BACKGROUND OF THE INVENTION

The present invention relates to a centrifuge container for indirect cooling of materials in a laboratory centrifuge, or a laboratory centrifuge and a method for producing a centrifuge container for indirect cooling of materials in a laboratory centrifuge.

The present invention relates in particular to laboratory centrifuges, this means centrifuges which are used in chemical, biological, biochemical or biotechnological laboratories. On the other hand, the present invention can also be used advantageously for large scale centrifuges and mechanical stirring devices and for all devices in which a material has to be cooled at least indirectly. Thus, the invention can also be used for dedicated cooling devices, like e.g. refrigerators or freezers, in particular laboratory refrigerators or freezers, in which a very deep cooling shall be achieved. In such dedicated cooling devices, the container forms the housing of the interior of the device, into which the material is placed.

The invention in particular does not relate to cookware, frying pans or similar containers, which are used for heating materials, which can be disposed in the container.

During centrifuge operation, heat is generated during the rotation of the centrifuge rotor in the centrifuge container through air friction and electrical power dissipation. Since the centrifuge container is closed with a cover, in order to prevent the material to be centrifuged from exiting, this heat import cannot simply be removed and leads to an increase of the temperature of the material to be centrifuged.

This temperature increase, however, is mostly undesirable. Therefore, already in the past, measures were taken to avoid an increase of the temperature of the material being centrifuged. This can be performed through direct cooling or through indirect cooling through a heat exchanger principle. Thus, for indirect cooling, there is no direct contact between the cooling medium and the material to be cooled or the enclosure of the material to be cooled.

For direct cooling, the ambient air directly at the centrifuge rotor is conducted through the centrifuge container, wherein the rotor acts like a radial fan. Thus, the centrifuge cover and/or the centrifuge container comprise a recess close to the axis, and an outlet opening disposed more remote with respect to the axis of rotation. Though such a direct cooling has proven effective, the centrifuge container, however, has to have an outlet opening, which also facilitates material egress. Such containers thus cannot be used for stirring devices or similar, in which materials shall be directly mixed, and which thus have to be configured closed all around. Using the ambient air as a cooling medium is a disadvantage of the direct cooling method, since the material can only be cooled down to the temperature of the ambient air at the most.

For indirect cooling, the rotor is enclosed in the centrifuge container under the centrifuge cover, and no cooling channel or similar is provided. Thus, the air only circulates within the centrifuge container. Cooling is now facilitated through a second medium, which is conducted along the outside of the container. This can either be ambient air, which is conducted past the exterior of the container, as implemented e.g. for the centrifuge 5424 of Eppendorf AG. Or alternatively, a particular cooling medium is conducted along the container through pipes that contact the container, this means the side walls and the bottom plate of the container in a spiral, in order to remove heat. In the latter variant of the indirect cooling, also a cooling of the material to a temperature below the temperature of the ambient air is possible. An advantage of the indirect cooling is better controllability of the temperature to be controlled, compared to direct cooling.

The cooling effect that is obtained through indirect cooling, however, is not as efficient so far as for direct cooling, therefore the energy requirement for the same cooling power is accordingly high. This is a consequence of the limited surface contact of the cooling medium, which is conducted past the outside of the container.

Attempts are known in the prior art to improve indirect cooling. Thus, U.S. Pat. No. 5,477,704 A describes a centrifuge container with copper cooling coils glued to its outer side wall and its base plate with an aluminum filled epoxy resin. The aluminum filled epoxy resin has high heat conductivity and is used for supporting the heat transfer from the centrifuge container. The cooling coils disclosed in U.S. Pat. No. 5,477,704 A, which are glued to the container, have a particular configuration. The side of the cooling coil which contacts the side wall or the base plate is flattened in order to increase the contact surface between the cooling coil and the container. However, it is difficult to apply epoxy resin to copper coils and a certain curing time is required before such a container can be used or processed further. Additionally, the container and the interconnection epoxy resin/copper have different thermal expansion coefficients. This means that cracking noises can occur when the temperature changes, which give the user an uncomfortable feeling with respect to the operational safety of the centrifuge.

It is the object of the present invention to provide a container that facilitates efficient indirect cooling and which can be manufactured in a simple and cost effective manner. Furthermore, a device operating with the container and a method for producing the container shall be provided. Thus, the container shall not only be used in centrifuge applications, but also in stirring devices, cooling devices and similar.

Containers in the sense of the instant invention are all devices in which a material to be cooled can be disposed directly or indirectly through a separate enclosure, and can be cooled through indirect cooling through a cooling device that is in heat conducting contact. The container according to the invention can be configured with various outer shapes. It can be round or kettle shaped. In such case, the container comprises a round base plate from which a side wall rises at the outer rim. The upper side of the container can be closed through a cover that can be opened. In an alternative embodiment, the container has edges; this means it is configured rectangular or square. It then has a rectangular or square base plate from whose outer rim four respective side walls extend. The upper side of the container is closed by an upper plate. Depending on the use of the container, either at least one of the side walls is configured as a door that can be opened, or the upper side of the container, this means the upper plate, is configured as a cover that can be opened. When a "side wall" is recited infra, this that the term also includes the plural; this means "side walls".

BRIEF DESCRIPTION OF THE INVENTION

Surprisingly, it was found that this object can be accomplished through a container with at least two layers according to claim 1. Also surprising are the results that can be achieved with a device, in particular the centrifuge according to claim 5. These results are surprising because so far there were no indications that an at least two-layer centrifuge container can provide such enormous improvement of the indirect cooling for a centrifuge.

Thus, the invention relates to:

(1) A container for indirect cooling of materials in a device like a centrifuge, stirring device, cooling device, like a refrigerator or similar, wherein the container can be brought into heat conducting contact with a cooling device of the device, and comprises a container body, wherein the container body comprises at least two container layers (10, 11) in heat conducting contact with one another and with different thermal conductivity, wherein the layer with higher heat conductivity (11) is disposed at the outside of the container to be cooled by the cooling device;

(2) a device for treatment, in particular centrifuging, stirring, cooling or similar of a material, in particular a laboratory centrifuge, a refrigerator, a freezer, in particular a laboratory refrigerator and/or a laboratory freezer or similar, with a container and a cooling device that is only in heat conducting contact with portions of a cooled outer surface of the container for indirect cooling of the material disposed inside the container, wherein the container is configured as a container according to (1); and (3) a method for producing the container according to (1), wherein the layer with higher heat conductivity (11) is disposed on the layer with lower heat conductivity (10) and vice versa.

"Heat conducting contact" in the context of the present invention means that the contact has to be configured, so that the heat transfer can be performed through heat conduction. Thus, the materials must be in contact, which, however, does not mean that they have to be in direct contact; between the two layers, one or multiple intermediary layers can also be disposed. "Heat transferring contact", however, means in the context of the present invention that the contact has to be configured so that a heat transfer can be performed through one of the three principle heat transfer mechanisms, heat conduction, heat radiation or heat convection. Thus, a physical contact of the materials is not mandatory. "Direct contact" between two objects means in the context of the present invention that two objects contact one another directly at least in portions and thus touch one another. When the terms "contact" or "contact location" are recited in the context of the present invention without the prefixes "heat conducting" or "heat transferring", this always means a direct contact.

Advantageous embodiments are described in the dependent claims.

BRIEF DESCRIPTION OF THE DRAWINGS

The invention will now be described with reference to the subsequent figures, which are also described in more detail in the detailed description of the invention, wherein.

DETAILED DESCRIPTION OF THE INVENTION

Figure 1:
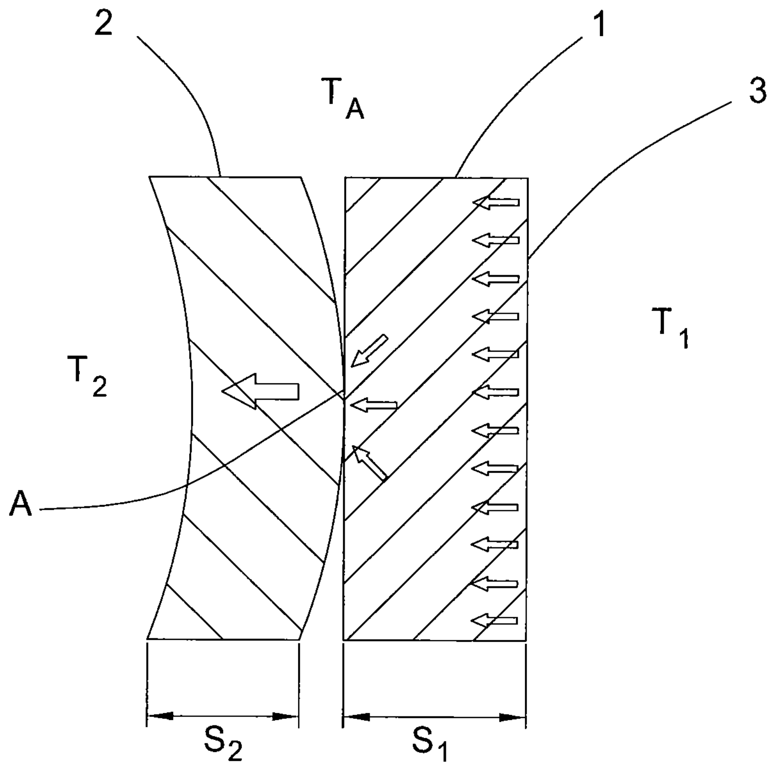
FIG. 1 illustrates a schematic detail of a conventional centrifuge container in contact with a cooling conduit.

The container according to the invention comprises a container body, which comprises at least two container layers in heat conducting contact with one another, which have different heat conductivity. Through the two container layers, a large contact surface is provided, which improves heat transfer during cooling. Since the layer with higher heat conductivity is disposed at the outside of the container to be cooled, the heat flow to the cooling device, which is only in heat conducting contact with portions of the container surface to be cooled, is increased. This increases the overall cooling efficiency.

In order to provide particularly efficient cooling, the heat conductivities shall differ by a factor greater 10, preferably greater 20, and particularly preferably greater 100.

In a particularly preferred embodiment, the layer with lower heat conductivity is formed from a material comprising stainless steel, steel, ceramic, glass and/or plastic, and the layer with higher heat conductivity is made from a material comprising aluminum, gold, carbon including its modifications graphite, diamond, carbon similar to diamond and carbon nano tubes, copper, magnesium, brass, silver and/or silicon and their alloys. This provides particularly efficient heat transfer and the container can also be produced easily. In particular, a configuration of the layer with higher heat conductivity as a foil is advantageous, e.g. as a pyrolitic graphite foil (PGS), since it can be applied to the layer with lower heat conductivity through simple manufacturing steps. Alternatively, also so-called nano layers can be used as layers with low heat conductivity, thus a layer that was created through nano technology. Furthermore, such a layer is represented as being made of a nano material.

The manufacturing cost can be reduced with good efficiency in that the layer with higher heat conductivity has a small thickness of less than 1 mm, preferably less than 0.5 mm, and in particular less than 0.2 mm. In this context, it is appreciated, that depending on the layer material, the heat flow decreases when the layers are too thick, and the heat transfer may be impaired when the layers are too thin, so that there is an optimum thickness for each layer material. A person skilled in the art will determine this optimum as a matter of routine.

Independent protection is claimed for a treatment device, in particular for centrifuging, stirring, cooling and similar of a material, in particular a laboratory centrifuge, a refrigerator, a freezer, a laboratory refrigerator, a laboratory freezer or similar with a container and a cooling device that is in heat conducting contact only with portions of a cooled outer surface of the container, for indirect cooling of the material disposed in the interior of the container, wherein the container is configured as the container according to the invention.

Thus, the container is advantageously enveloped by a tubular conduit, which is preferably wound about the container in a spiral. The term "tubular" comprises round tubes and also tubes with at least one flattened side, in particular also rectangular tubes.

"Only in portions" means in the context of the present invention that the contact surface between the cooling device and the cooled outer surface of the container is smaller than the cooled outer surface of the container. The cooling device can thus also be formed by plural separately operating devices, wherein, however, their entire contact surface shall be smaller than the cooled outer surface of the container.

Due to the efficiency of the indirect cooling thus facilitated, providing cooling conduits on the base of the container can be omitted. However, the temperature e.g. in a centrifuge container rises exponentially as a function of the speed of rotation, so that for very high speeds and/or for intended very deep cooling, additional cooling conduits have to be provided at the base of the container.

The indirect heat transfer according to the invention can certainly also be coupled with a direct heat transfer, e.g. the known rotor air based centrifuge cooling.

Furthermore, independent protection is claimed for the method for producing the container according to the invention, in which the layer with higher heat conductivity is disposed on the layer with lower heat conductivity and vice versa. For example, this can be performed in that a layer, preferably the layer with the higher heat conductivity is plated onto the other layer and the container is then formed or two layers separate from one another are placed on top of one another, e.g. as foils or plates, and the container is formed e.g. through simultaneously forming of the layers, e.g. deep drawing.

However, it is preferred when the layer with higher heat conductivity is applied to the layer with lower heat conductivity after the layer with lower heat conductivity has substantially assumed the shape of the container or vice versa, the layer with lower heat conductivity is applied to the layer with higher heat conductivity after the layer with higher heat conductivity has taken substantially the shape of the container. Then the manufacturing process can be configured more cost effective, wherein e.g. the layer with higher heat conductivity is applied to the layer with lower heat conductivity through a galvanic process or vice versa.

In conclusion, it is appreciated that the inventors have found that for indirect cooling the efficiency substantially depends on the heat transfer between the elements of the heat exchanger, as will be described subsequently. Thus, for describing the heat transfer processes, only heat conduction will be considered, and heat radiation and heat convection are not considered.

The heat flow in a solid object is defined as:

$$\dot{Q} = \lambda \cdot \frac{A}{s} \cdot \Delta T,$$

wherein $\dot{Q}$ is the heat flow through the solid object, $\lambda$ is the heat conductivity, which is a material constant, A is the size of the cross section area of the solid object, s is the thickness of the solid object and $\Delta T$ is the temperature difference between the input side and the output side of the heat flow.

The principle of the invention and its advantages are subsequently described in more detail with reference to the drawing Figure with reference to centrifuge containers.

With reference to FIG. 1, this principle is described purely schematically for a known centrifuge container, which is shown in detail with a container wall 1, which container is contact with a cooling conduit 2. Thus, the heat flow which is indicated by arrows and flows from the inside 3 of the container with a temperature T1 through the container wall 1, which has a wall thickness of s1, through the contact surface A between container wall 1 and cooling conduit 2 with a temperature TA through the material of the cooling conduit 2, which conducts cooling medium, which cooling conduit has a wall thickness s2, wherein the cooling medium comprises the temperature T2.

For simplification purposes, furthermore, the assumption is made that the wall thicknesses s1 and s2 are equal, thus s=1 mm, the cross section of the contact surface A=1 mm2 and the heat flow outside of the contact surface A is equal to zero, thus an air gap is provided. Thus, the heat flow through the container wall 1 can only occur through the contact surface A, and the following is computed for the heat flow through the container wall 1:

$$\dot{Q}=\lambda_1 \cdot (T_1-T_A)$$

and for the heat flow through the material of the cooling conduit 2 conducting the cooling medium:

$$\dot{Q}_2=\lambda_2 \cdot (T_A-T_2)$$

According to the continuity principle: $\dot{Q}_1=\dot{Q}_2$.

After insertion:

$$\lambda_1 \cdot (T_1-T_A)=\lambda_2 \cdot (T_A-T_2).$$

With $T_1-T_A=\Delta T_1$ and $T_A-T_2=\Delta T_2$ results eventually:

$$\lambda_1 \cdot \Delta T_1=\lambda_2 \cdot \Delta T_2.$$

When $\lambda_1<\lambda_2$ is selected, the consequence is that $\Delta T_1>\Delta T_2$.

For an application in a centrifuge, T2 is continuously kept low through a coolant. This means in reverse conclusion that the temperature T1 in the interior of the container will have a much higher temperature difference from the temperature of the contact location TA.

In order to be able to reduce the temperature T1 in the interior of the container even further, in principle, there is also the possibility to reduce the wall thicknesses s1 and s2, and/or to produce the container wall 1 from a material with very high heat conductivity $\lambda_1$, e.g. from copper or silver, however, the first possibility is technically limited by the functional design of the components and is typically also exhausted, and the second possibility does not apply for reasons of application technology and the particular application since copper or silver are not chemically inert.

This leaves the practical option to increase the contact surface A. For this purpose, rectangular tubes instead of round tubes can be used, since typically round copper pipe is used for the components conducting coolant, and when using rectangular tubing, a substantial increase of the contact surface A is accomplished. However, it is not possible technologically at this point in time to establish a complete contact of the rectangular pipe wall with the centrifuge container. There are always gaps where there is no effective heat transfer.

Figure 2:
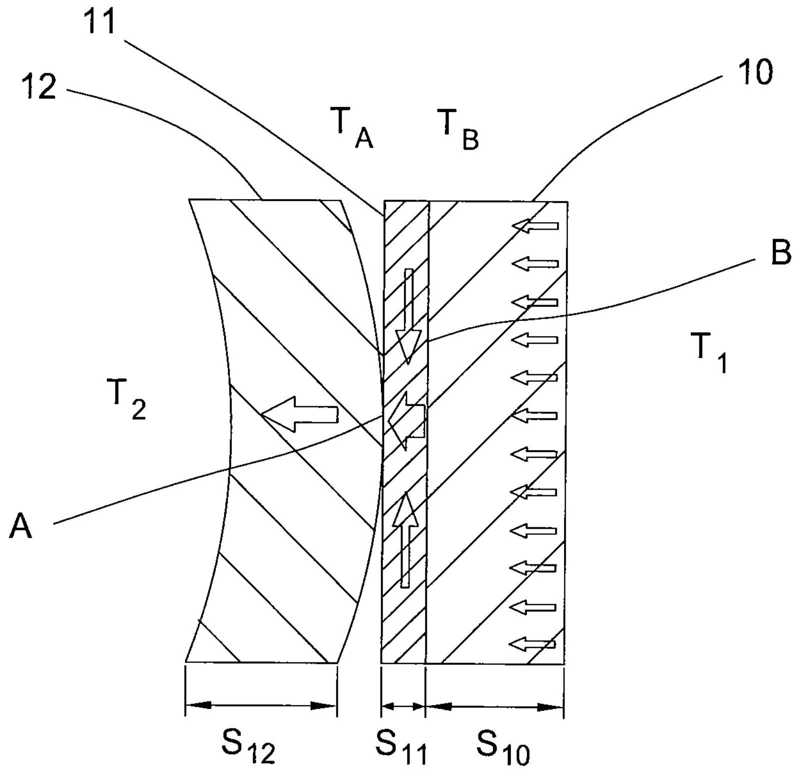
FIG. 2 illustrates a schematic detail of a centrifuge container according to the invention in contact with a cooling conduit.

The solution according to the invention provides an additional heat transfer layer at the outer wall of the container, as shown schematically in FIG. 2, for the resultant heat flow illustrated through the arrows in a detail. This inserts an additional contact surface with a large contact area.

Differently from the centrifuge container according to FIG. 1, besides the inner container layer 10 with the thickness s10, which defines the interior of the container, an additional outer container layer 11 with a thickness s11 made from material with good heat conductivity is applied as an outer wall of the container. The cooling conduit 12 has the thickness s12.

For simplification purposes, also here, the assumptions of FIG. 1 hold that for all wall thicknesses s=1 mm, the cross section of the contact surface A=1 mm2 between the outer container layer 11 and the cooling conduit 12, and the heat flow outside of the contact surface A is equal to zero, thus an air gap is provided.

Additionally herein, however, a contact surface B between the container layers 10, 11 is provided, which is much larger than the other contact surface A. The heat flow now passes through the three materials of the inner container layer 10, the outer container layer 11 and the cooling conduit 12, and through the contact locations A, B, which differ greatly in size.

Also here holds according to the continuity principle: $\dot{Q}_1=\dot{Q}_{B\text{-}A}=\dot{Q}_2$.

Insertion into the formula for the heat flow yields the following:

$$\lambda_1 \cdot B \cdot (T_1 - T_B) = \lambda_{A\text{-}B} \cdot A \cdot (T_B - T_A) = \lambda_2 \cdot A \cdot (T_A - T_2).$$

With the additional simplification that the materials of the outer container layer 11 and of the cooling conduit 12 are identical, and therefore $\lambda_{A\text{-}B}=\lambda_2$ holds, the equation is simplified as follows:

$$\lambda_1 \cdot B \cdot \Delta T_1 = \lambda_2 \cdot \frac{A}{2} \cdot \Delta T_2.$$

and with $T_1 - T_B = \Delta T_1$ and $T_B - T_2 = \Delta T_2$ follows:

$$\lambda_1 \cdot B \cdot (T_1 - T_B) = \lambda_2 \cdot \frac{A}{2} \cdot (T_B - T_2),$$

This means when $\lambda_1 < \lambda_2$ is selected in turn; it follows as a consequence that $\Delta T_1 > \Delta T_2$. However, a portion of the required temperature difference is absorbed by the much larger contact surface B, or put differently:

$$B \cdot \Delta T_1 > \frac{A}{2} \cdot \Delta T_2.$$

For a centrifuge application with cooling, T2 is continuously kept low through the coolant. This, however, means in reverse conclusion, that the temperature T1 in the interior of the container, however, has to have a greater temperature difference from the temperature TB of the contact location, however, the temperature difference in turn is smaller than described in the context of FIG. 1, since B>>A.

Figure 3:
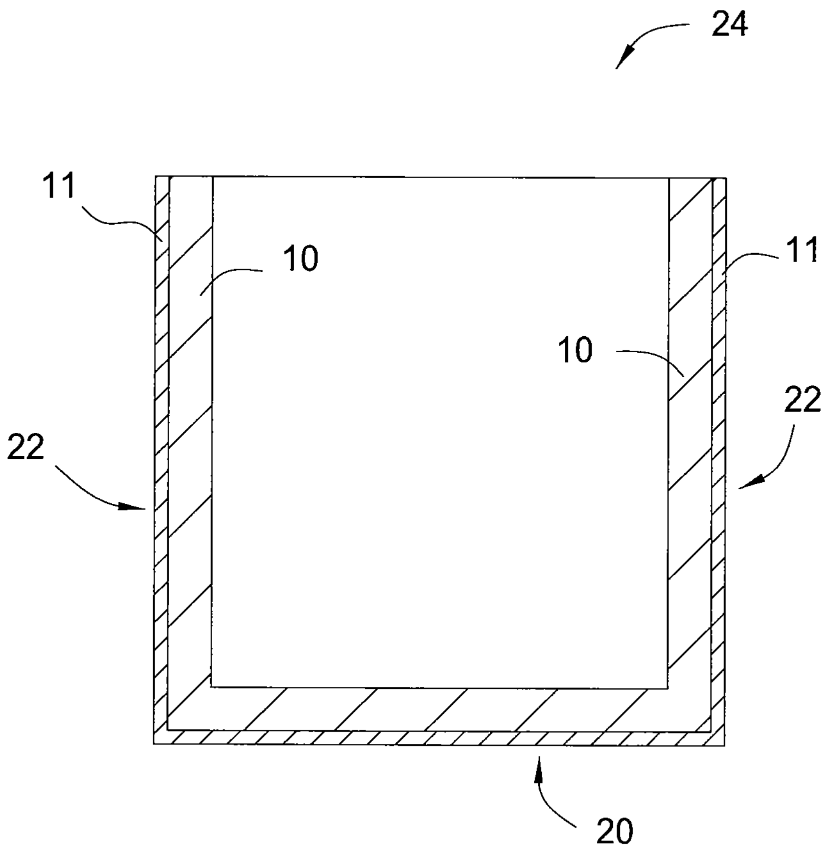
FIG. 3 is a schematic sectional view of a centrifuge container according to one embodiment of the present invention.

The container according to the invention can be configured with various outer shapes. It can be round or kettle shaped. As shown in FIG. 3, a container 24 comprises a round base plate 20 from which a side wall 22 rises at the outer rim. The upper side of the container 24 can be closed through a cover (not shown) that can be opened.

Figure 4:
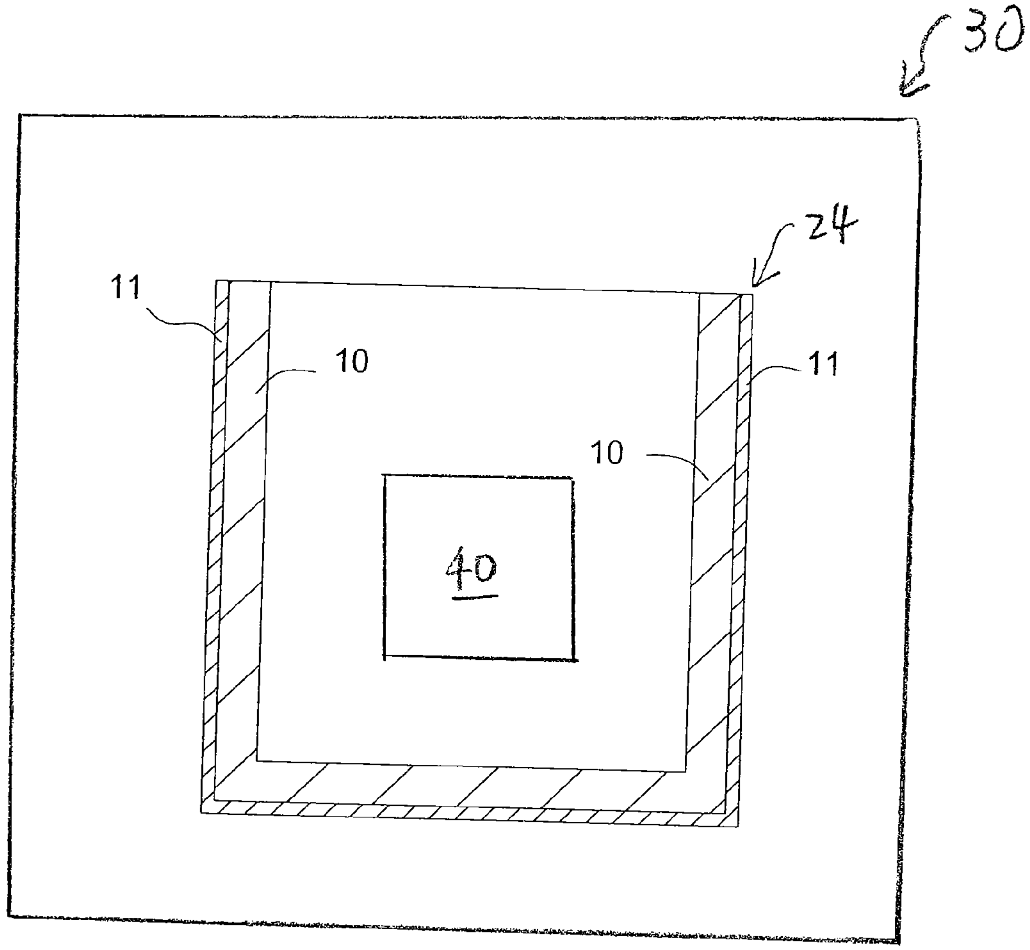
FIG. 4 schematically illustrates a centrifuge according to one embodiment of the present invention.
Figure 4:
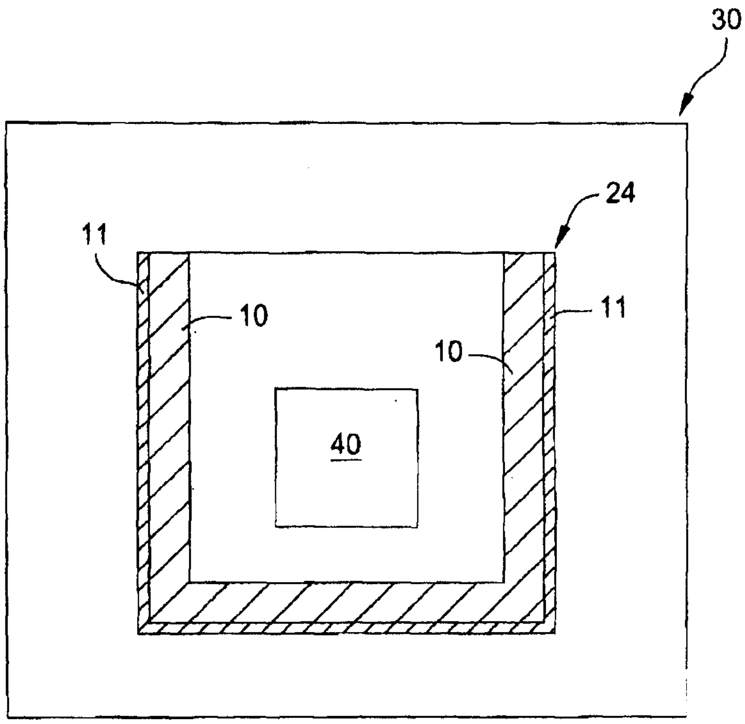

FIG. 4 schematically illustrates a centrifuge 30 according to one embodiment of the present invention. The centrifuge 30 includes the centrifuge container 24 as depicted in FIG. 3. A rotor 40 is enclosed in the centrifuge container 24.

Though, the principle of the invention has been described supra with reference to two container layers with different heat conductivities, it is evident, however, that also three or more layers can be used. These can be in particular layers for corrosion protection, contamination protection or similar. The only important thing is that the layer with higher heat conductivity is disposed at the outer surface of the container to be cooled. However, one or multiple additional layers can be disposed between the layer with higher heat conductivity and the layer with lower heat conductivity, and also on the layer with lower heat conductivity, in order to adapt the container to particular applications.

PREFERRED EMBODIMENT

Subsequently, the effects of the invention are compared for a preferred embodiment to a prior art embodiment.

A laboratory centrifuge 5415R of Eppendorf AG was used, which comprises a spiral shaped rectangular tube as a cooling conduit 2, 12, which has a width of 9.5 mm, a height of 5 mm and a materials thickness of 0.5 mm. Thus, an off the shelf centrifuge container 1 with 185 mm diameter, 70 mm height and a wall thickness of 1 mm (Art. No. 5426 123.101-00) of Eppendorf AG is used, which is made of V2A-stainless steel (heat conductivity approximately 15 W/m*K), and provided with a heat transfer paste (heat conductivity approximately 15 W/m*K) and disposed in the cooling conduit, in order to conduct the exemplary comparison. For the embodiment according to the invention, the off the shelf centrifuge container 10 (Art. No. 5426 123.101-00) of Eppendorf AG is provided with a 0.1 mm thick copper plating 11 (heat conductivity approximately 350 W/m*K), otherwise the setup is the same, this means the centrifuge container is connected to the rectangular cooling conduit 12 through heat transfer paste (heat conductivity approximately 15 W/m*K).

In both cases the centrifuge 5415R is operated with an off the shelf rotor F45-24-11 of Eppendorf AG for an hour at a maximum of 13,200 RPM. The minimum achievable sample temperature is measured with a temperature measurement device. The results are shown in the table.

TABLE

| | 5415R with Centrifuge Container without Cu-plating | 5415R with Centrifuge Container with Cu-plating |
|---|---|---|
| Room Temperature [° C.] | 25 | 26 |
| Sample Temperature [° C.] | 3.9 | 0.4 |

The results show that copper plating 11 of the centrifuge container 10 provides a much lower sample temperature at identical cooling power. The copper plating 11 improves the heat conductivity of the centrifuge container 10, and thus the efficiency of the cooling system. A lower sample temperature is provided at the same electrical energy consumption.

This shows that the present invention provides a much more efficient indirect cooling from the outside of the container into the inside of the container. The improvement of the heat conductivity and of the heat transfer of centrifuge containers provides cooled centrifuges with a reduction of the required power of the cooling system. Through the increased performance of the centrifuge, a higher speed can be run for the same temperature of the materials to be centrifuged, and/or at the same temperature of the material centrifuged and at the same speed, the power input of the cooling device can be reduced.

The principle of the invention is based on the finding that for the indirect cooling of a container surface, which is greater than the contact surface between the container and the cooling device, the cooling effect can be increased when the container, besides a layer with low heat conductivity, comprises a layer with higher heat conductivity, and thus the layer with higher heat conductivity is disposed at the outer container surface to be cooled, and thus is in heat conducting contact with the cooling device. Thus, the cooling power is transferred better into the interior of the container and to the material to be cooled therein.

An alternative solution is comprised in that the contact surface between the cooling device and the cooled surface of the container has at least the same size as the cooled container surface. This can be implemented in that a portion of the cooling device is a portion of the layer of the container with greater heat conductivity.

Thus it can e.g. be provided that the second layer is made from a solid material like copper and the cooling device is disposed directly in this layer.

On the other hand the cooling device can be disposed in a liquid, gel or similar which is in heat conducting contact with the layer with low heat conductivity and which comprises a higher heat conductivity itself. For this purpose either the container comprises a layer which comprises a cavity which can be filled with a liquid, gel or similar between itself and the layer with low heat conductivity, in which cavity the cooling device is disposed. The heat conductivity of this additional layer is insignificant because it is disposed on the outside with respect to the cooling device. Or the container itself does not comprise the liquid, the gel or similar, but it is provided in a device with the cooling disposed therein, in which device the container can be disposed, so that the liquid, the gel or similar is in heat conductive contact with the layer with low heat conductivity. Thus e.g. the container in the sense of a bath can be completely submerged in the liquid, the gel or similar like a bath, preferably to the rim or the liquid, the gel or similar is only in contact with a portion of the outer container surface. For transporting preferably care should be taken that a sufficient sealing of the liquid, gel or similar is provided.

Between the liquid, gel or similar and the layer with low heat conductivity also an additional layer with higher heat conductivity can be disposed. For example the liquid, gel or similar with the cooling device can be disposed within a copper enclosure which is either directly integrated into the container or provided in the device, wherein the container can then be brought into direct contact with the copper enclosure. Thus also the sealing can be provided. The terms “liquids” or “gels” also include Newton liquids and also non Newton liquids, salt solutions, dispersions, suspensions and also any combination of 2 or more of the listed substances. In particular a liquid or gel can be selected from the following group: water, ionic liquids, suspensions of carbon nona tubes, cooling salt solutions, eutectica, or eutectic mixtures and similar materials. In particular suitable are: antifrogenes, this means heat transfer liquids based on glykoles (Antifrogen N, Antifrogen L and Antifrogen SOL) or potassiumformiate (Antifrogen KF). Furthermore ionic liquids are being used, like e.g. 1-ethyl-3-methylimidazolium chloride, 1-ethyl-3-methylimidazolium methanesulfonate, 1-butyl-3-methylimidazolium chloride, 1-butyl-3-methylimidazolium methanesulfonate, 1-ethyl-2,3-di-methylimidazolium ethylsulfate (sold under the trademark Basionics® of BASF SE, 67063 Ludwigshafen, Germany) can be used. Polyalkylenglykolderivates can also be used.

The advantage of this alternative solution is that the cooling device itself does not have to be in direct contact anymore, which is possibly established by a heat conductive paste, with the container surface to be cooled. Thus there are not so stringent requirements with respect to the winding geometry of the cooling tube with respect to the outer container contour, which reduces cost.

The invention claimed is:

1. A centrifuge container for indirect cooling of materials in a laboratory centrifuge, wherein the centrifuge container can be brought into heat conducting contact with a cooling device of the centrifuge, and comprises:

a container body, wherein the container body is made of a material comprising stainless steel or steel; and a layer in heat conducting contact with the container body, wherein the layer has higher heat conductivity than the container body and is attached to an outside of the container body to be cooled by the centrifuge, wherein the layer with higher heat conductivity is made of a material comprising aluminum, gold, copper, magnesium, brass, silver or combinations thereof, and the container is adapted to enclose a centrifuge rotor of the centrifuge, wherein the layer with higher heat conductivity consists of a metal layer formed by a plating process and having a thickness of less than 1 mm.

2. The centrifuge container according to claim 1, wherein the higher heat conductivity is greater by a factor of at least 10.

3. The centrifuge container according to claim 1, wherein the layer with higher heat conductivity has a thickness of less than 0.5 mm.

4. The centrifuge container according to claim 2, wherein the layer with higher heat conductivity has a thickness of less than 0.5 mm.

5. The centrifuge container according to claim 3, wherein the layer with higher heat conductivity has a thickness of less than 0.2 mm.

6. The centrifuge container according to claim 4, wherein the layer with higher heat conductivity has a thickness of less than 0.2 mm.

7. The centrifuge container according to claim 1, wherein depending on the material of the layer with higher heat conductivity the thickness of the layer with higher heat is adapted, so that neither a heat flow through that layer will decrease nor a heat transfer through that layer will be impaired.

* * * * *

UNITED STATES PATENT AND TRADEMARK OFFICE

CERTIFICATE OF CORRECTION

PATENT NO. : 8,845,967 B2
APPLICATION NO. : 13/539137
DATED : September 30, 2014
INVENTOR(S) : Grimm et al.

It is certified that error appears in the above-identified patent and that said Letters Patent is hereby corrected as shown below:

In the Drawings

The drawing sheet, consisting of Fig. 4, should be deleted to be replaced with the drawing sheet, consisting of Fig. 4, as shown on the attached page.

In the Specification

Column 6, Line 14, delete "$\dot{Q} = \lambda_1 \bullet (T_1 - T_A)$" and insert -- $\dot{Q}_1 = \lambda_1 \bullet (T_1 - T_A)$ -- therefor;

Column 7, Line 20, delete "$\lambda_1 \bullet B \bullet \Delta T_1 = \lambda_2 \bullet \frac{A}{2} \bullet \Delta T_2$" and insert -- $\lambda_1 \bullet B \bullet (T_1 - T_B) = \lambda_2 \bullet \frac{A}{2} \bullet (T_B - T_2)$ -- therefor;

Column 7, Line 26, please delete "$\lambda_1 \bullet B \bullet (T_1 - T_B) = \lambda_2 \bullet \frac{A}{2} \bullet (T_B - T_2)$" and insert -- $\lambda_1 \bullet B \bullet \Delta T_1 = \lambda_2 \bullet \frac{A}{2} \bullet \Delta T_2$ -- therefor.

Signed and Sealed this
Seventeenth Day of March, 2015

Michelle K. Lee

Michelle K. Lee
*Director of the United States Patent and Trademark Office*